June 14, 1927.
H. H. KIRK-SCHNEIDER
MIRROR
Filed Aug. 24, 1926
1,632,236
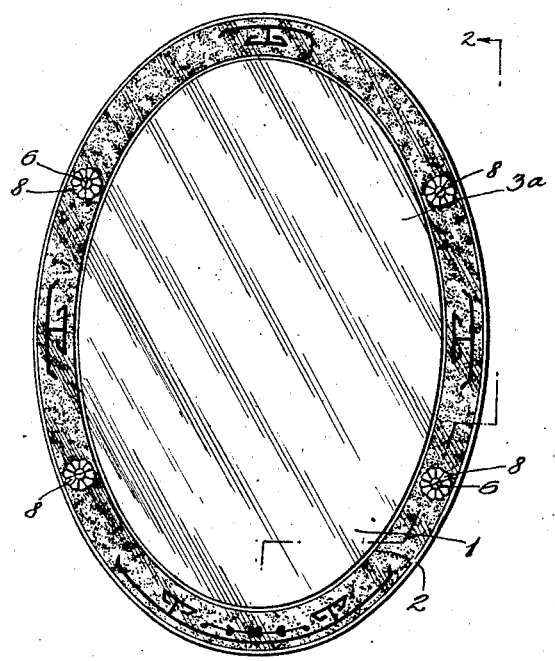
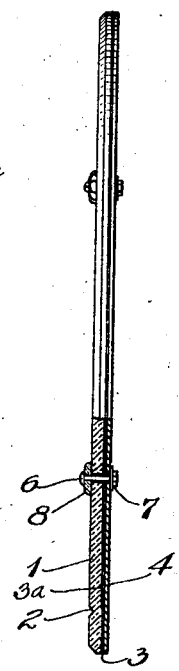
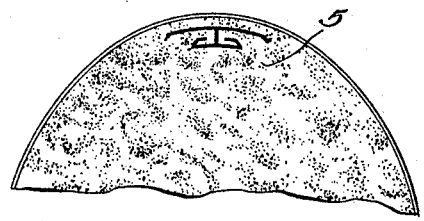
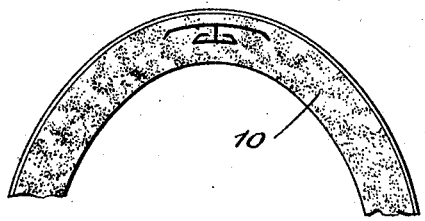
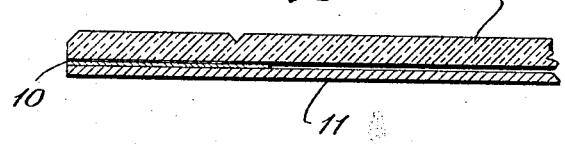
INVENTOR
HUGO H. KIRK-SCHNEIDER
BY
J. Granville Meyers
ATTORNEY Patented June 14, 1927.

1,632,236

UNITED STATES PATENT OFFICE.

HUGO H. KIRK-SCHNEIDER, OF NEW YORK, N. Y.

MIRROR.

Application filed August 24, 1926. Serial No. 131,191.

This invention is an improvement in mirrors, and more particularly in a method of providing a mirror having an ornamental framing part which may be changed to provide different color schemes and the like.

In the usual construction, the mirror is composed of a plate of glass of suitable size and shape, silvered on the back in the usual manner and enclosed by an independent frame, which may be of any desired character.

One of the primary objects of the present invention is the provision of a mirror, wherein the frame is an integral part of the mirror, but set off and distinguished from the reflecting portion thereof in a definite but pleasing manner.

Another object is the provision of a mirror, wherein the ornamentation and the coloring of the frame may be changed in accordance with the taste of the buyer.

A further object is the provision of a mirror of pleasing appearance, which may be easily and cheaply constructed.

With these and other objects in view, the invention consists in the construction and novel combination of parts fully described hereinafter, illustrated in the accompanying drawings, and pointed out in the claims appended hereto, it being understood that various changes in the form, proportion, size and minor details of construction within the scope of the claims, may be resorted to without departing from the spirit of the invention.

In the drawings:—

Fig. 1 is a plan view of the improved mirror.

Fig. 2 is a section on the line 2—2 of Fig. 1.

Fig. 3 is a partial plan view of the framing and backing parts.

Fig. 4 is a view similar to Fig. 3, showing an alternate construction.

Fig. 5 is an enlarged detailed section, of the complete construction, the framing of which is indicated in Fig. 4.

In the present embodiment of the invention, the improved mirror is made from a plate 1 of glass of suitable dimensions, and having a marginal contour of the shape desired. On one face of the plate, and preferably on that face which will be at the front in the completed mirror, a continuous substantially V-shaped groove 2 is cut or otherwise formed, the groove enclosing an area of the glass having a regular outline, such as rectangular, oval or circular, and this area is symmetrically disposed with respect to the plate.

In the present instance the groove is substantially parallel with the margins of the plate, but spaced apart therefrom a suitable distance, in accordance with the width of frame desired, the width being also governed to a certain extent by the area of the mirror. It will be obvious that the space enclosed by the groove does not necessarily have the same outline as the plate. As for instance, the plate might be rectangular and the space enclosed by the groove oval, circular, or otherwise.

While the groove is preferably on that face of the plate which will be the front in the completed mirror, it is obvious that it may be on the face which will be the rear, but in either case the arrangement of the groove, and the relation of the area within the groove to the plate is the same. As for instance, in the present embodiment, were the groove on the back, it would be spaced from the margin of the plate and parallel therewith.

That portion of the plate within the groove is provided with a reflecting surface 3ª, as for instance, by silvering, the silvering being on the rear face of the plate. The plate is backed by a backing, of the same area as the plate, and usually having the same marginal contour. This backing, which may be of any suitable character, as for instance, celluloid, is provided near the margin and on that portion of the backing which will be outside the groove 2 in the completed mirror, with decorations of any desired character indicated at 5. This portion of the backing in the completed mirror is covered by clear glass and is visible through the same.

The backing may be, and preferably is, colored, and the ornamentation may be of any suitable character. In the present instance, the backing is of a composite nature, including the ornamented sheet 3 and a plain sheet 4 of a heavier nature. A pleasing effect is obtained by the use of celluloid for the backing 3, and this backing may be secured to the layer 4 if desired, so that the layers 3 and 4 are in effect a unitary structure. It will be obvious that the layer 3 might be of cloth, or even in some instances, paper.

The backing is secured to the plate in any suitable manner; in the present instance, by screws 6. These screws are passed through the registered openings in the plate and the backing, and are engaged by nuts 7 on the rear face of the backing. Ornamental rosettes 8 of glass or the like are arranged between the heads of the screws and the plate, the rosettes serving as washers. Suspending means for the mirror, or an easel support, may be carried by the backing, in accordance with the type of mirror desired. It is obvious also that the plate may be provided with an integral handle, when a hand-mirror is desired, and in this construction the ornamental framing part, that is the layers 3 and 4, would be extended over the handle.

In Figs. 4 and 5 the framing behind the clear glass of the plate 9 is provided for by a ring 10, of material similar to that of the layer 3, and similarly ornamented. This ring is arranged between the plate 9 and a suitable backing 11, which is secured to the plate in any suitable manner, as for instance, in the same manner as the backing 3—4 is secured to the plate 1. This provides a somewhat cheaper construction, since only enough of the relatively expensive material forming the ornamental part of the backing is used.

It will be evident from this description that the improved mirror is composed of a single integral plate of glass, the plate providing a reflecting surface and a frame therefor. The plate carries a reflecting surface, but the ornamentation or framing part cooperating with the clear glass is carried by the backing or is separate from the glass. This arrangement enables the substitution of one character of ornamentation for another. For instance, a buyer may like the shape and size of the mirror, but object to the ornamentation or the color scheme of the frame. Such objection could be easily cured by substituting for the backing another with color and ornamentation more pleasing to the prospective buyer.

It will be understood that the invention consists in the provision in a plain glass plate of a silvered area encircled by a clear glass area, together with a suitable backing visible through the clear glass area to form a backing therefor, and of a nature contrasting to the silvered area. The object of the groove is to clearly set off and separate the reflecting surface from the clear glass area, and this dividing line might be provided for in any other way, as for instance by the margin of the silvering or reflecting surface. It is obvious also that the improved mirror might have a separate framing part of clear glass. That is, the mirror might be in two pieces, one the reflecting surface, and the other the clear glass frame.

What is claimed as new is:

1. A mirror comprising a glass plate of suitable dimensions and marginal contour having a central area provided with a reflecting surface and a marginal clear glass framing portion, a backing separable from and independent of the plate and provided with ornamentation visible through the clear glass for framing the reflecting portion, and means extending through the glass and backing for detachably connecting them together, said means harmonizing with the visible part of the backing and cooperating therewith in the ornamentation of the frame.

2. A mirror comprising a glass plate of suitable dimensions and marginal contour, having on one face thereof a continuous substantially V-shaped groove enclosing an area of regular outline symmetrically disposed with respect to the plate, said area provided with a reflecting surface, a backing plate provided on that portion of the face thereof adjacent to the plate, and outside the groove, with ornamentation visible through the clear glass for framing the reflecting surface, and means extending through the glass and backing for detachably connecting the plate and backing, said means harmonizing with the visible part of the backing and cooperating therewith in the ornamentation of the frame.

3. A mirror comprising a glass plate of suitable dimensions and marginal contour having a central area provided with a reflecting surface and a marginal clear glass framing portion, a backing separable from and independent of the plate and provided with ornamentation visible through the clear glass for framing the reflecting portion, and means engaging the glass and backing for detachably connecting them together, said means harmonizing with the visible part of the backing and cooperating therewith in the ornamentation of the frame.

4. A mirror comprising a glass plate of suitable dimensions and marginal contour having a central area provided with a reflecting surface and a marginal clear glass framing portion separated from the central reflecting area by a substantially V shaped groove, a backing provided with ornamentation visible through the clear glass for framing the reflecting portion, and means engaging the glass and backing for detachably connecting them together, said means harmonizing with the visible part of the backing and cooperating therewith in the ornamentation of the frame.

Signed at New York City, in the county of New York and State of New York this 21st day of August, A. D. 1926.

HUGO H. KIRK-SCHNEIDER.